Figure 4:
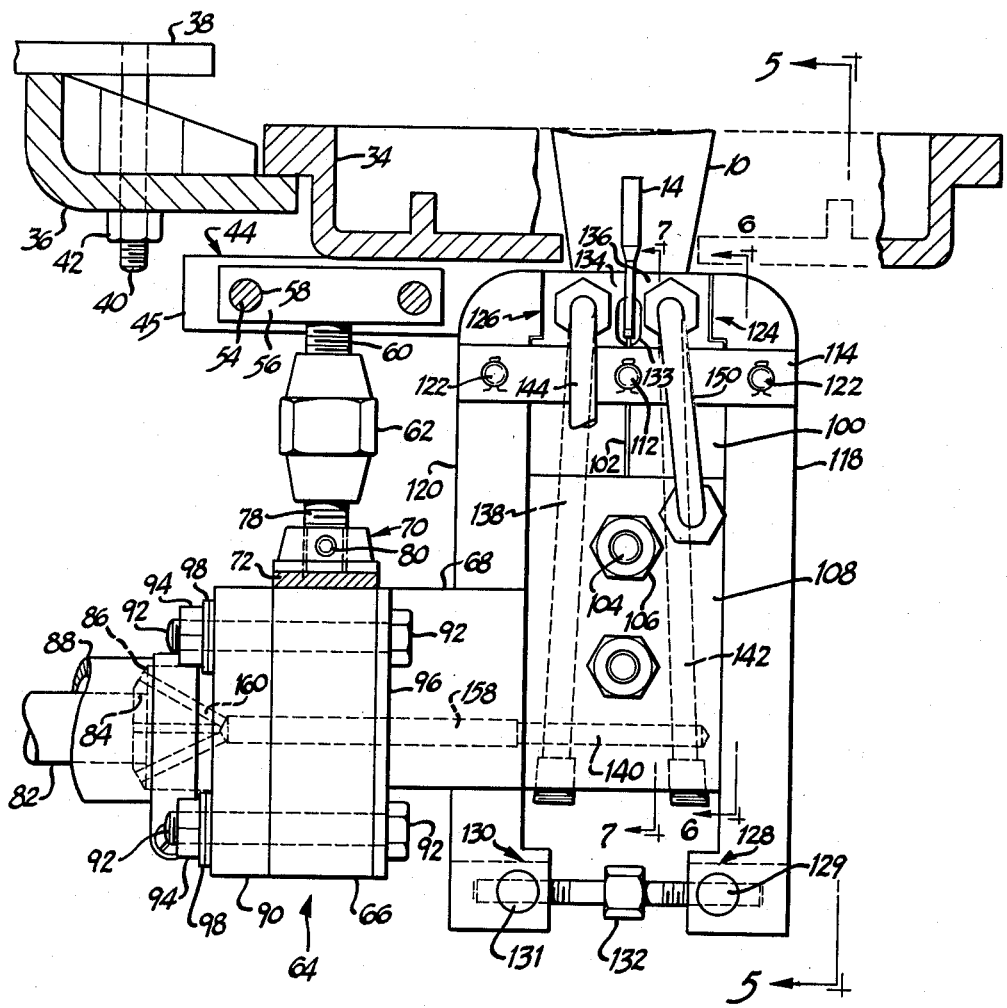

Nov. 19, 1963     J. C. RUSHTON     3,111,550
APPARATUS FOR MELTING HEAT SOFTENABLE MATERIALS
Filed June 30, 1961     3 Sheets-Sheet 1
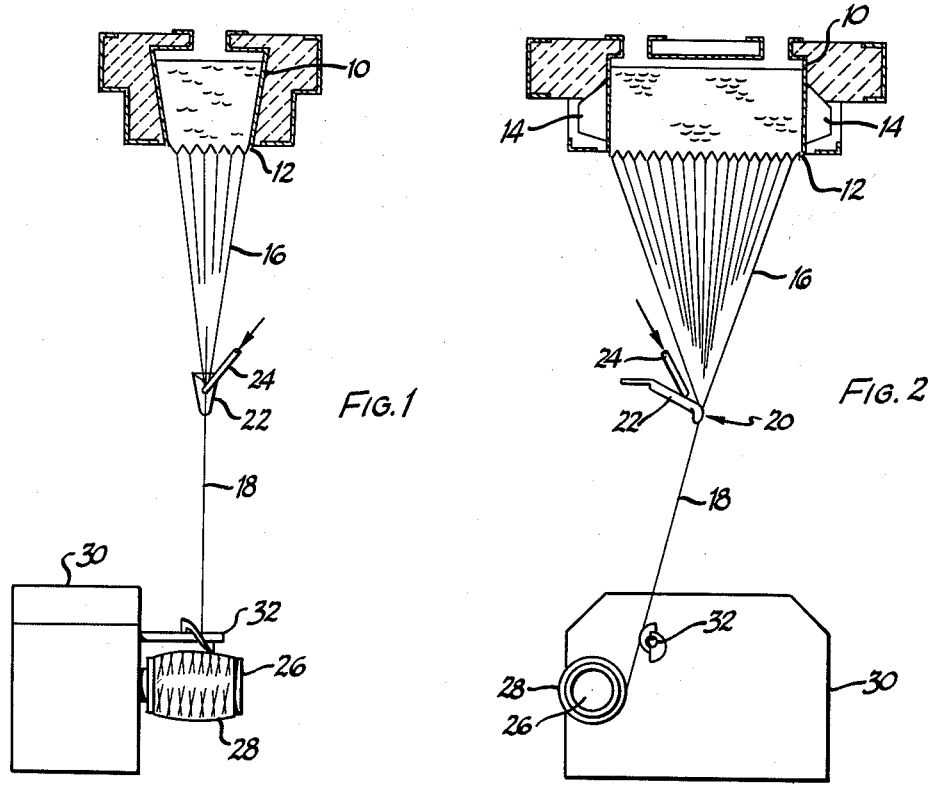
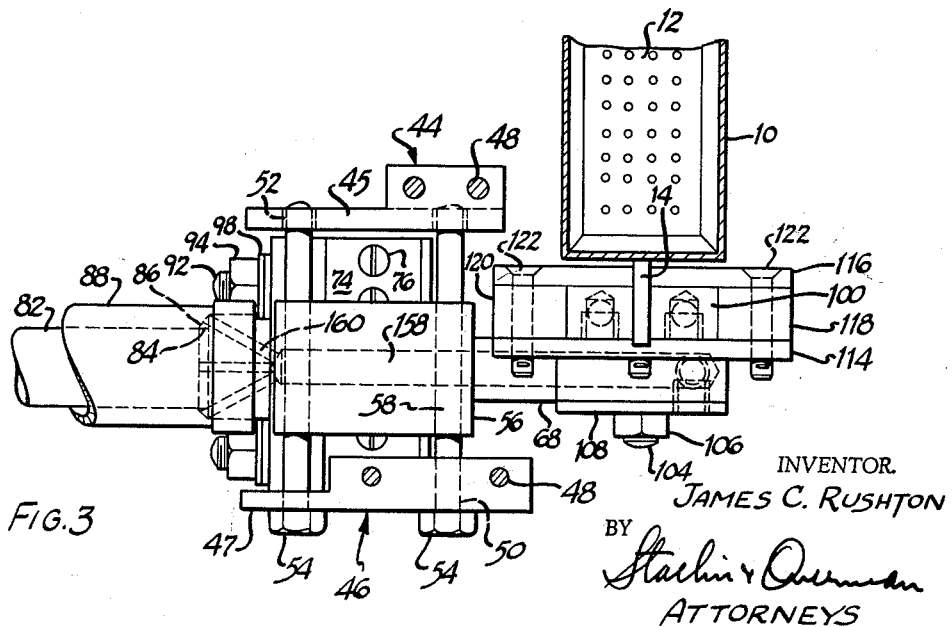
INVENTOR.
JAMES C. RUSHTON
BY
ATTORNEYS Nov. 19, 1963 J. C. RUSHTON 3,111,550
APPARATUS FOR MELTING HEAT SOFTENABLE MATERIALS
Filed June 30, 1961 3 Sheets-Sheet 3

INVENTOR.
JAMES C. RUSHTON
BY
ATTORNEYS

# United States Patent Office 3,111,550
Patented Nov. 19, 1963

3,111,550
APPARATUS FOR MELTING HEAT SOFTENABLE MATERIALS
James C. Rushton, Aiken, S.C., assignor to Owens-Corning Fiberglas Corporation, a corporation of Delaware
Filed June 30, 1961, Ser. No. 121,156
6 Claims. (Cl. 13—6)

This invention relates to apparatus for melting heat softenable materials such as glass, and more particularly to a combination bus bar support and terminal clamp for a feeder or bushing for producing continuous glass fibers.

In the production of continuous glass fibers, a glass feeder or bushing is utilized for forming a plurality of molten glass streams which are attenuated or drawn out to form fibers. The bushing is of generally elongated, rectangular configuration and is provided at its ends with electrical terminals. Heavy electrical bus bars are connected to the terminals and electrical current is thereby passed through the bushing to heat the bushing to glass melting temperatures by resistance.

In order to withstand the temperatures encountered in melting glass, platinum or an alloy thereof with iridium is generally employed to form the bushing. Platinum is a ductile metal and accordingly is subject to bending and deformation, particularly at elevated temperatures as in the glass melting range of 2000–2500° F. Thus, any stresses placed on the terminal or on the bushing will generally result in deformation of the terminal or bushing or both.

In the past, a substantial number of problems have been encountered with respect to the bending of terminals and early failure of bushings. One common reason why the terminals of bushings become deformed is that during installation, the terminal and the bus bar clamp may not be properly aligned; accordingly a workman will force the clamp onto the terminal with resultant deformation of the soft metal of the terminal.

Also during operation of a bushing, the heat pattern through the bushing will change, requiring adjustment of the bus bar terminal clamp on the bushing terminal. Heretofore substantially rigid bus bars of heavy copper have been employed in order to conduct the necessary amounts of current into the bushing. When it was necessary to adjust the terminal clamp on the terminal to correct or adjust the heat pattern, a clamping bolt was loosened and the terminal clamp forced to a different position by forcing the bus bar. This has been at best a hit or miss procedure and accurate positioning of the clamp on the terminal without setting up a stress on the terminal has been substantially impossible. Also, the forced deflection of the terminal clamp often caused misalignment of the clamp and the terminal. Subsequently, when the clamp was tightened, the terminal, being ductile, was deformed into alignment with the clamp and in extreme instances was actually fractured. Since a bushing is a welded structure, the stresses applied to the terminals pull and distort the welds; this usually results in premature failure of the bushing.

Further, during operation of a bushing, it expands and contracts because of heating and cooling. Prior bus bars have been relatively rigid and immovable with respect to the bushing. Due to this relative rigidity, the bushing was compressed or stretched between the bus bars at either end thereof and thus placed under stresses often resulting in fracture and early failure.

All of the foregoing have often resulted in the application of substantial stresses to the bushing terminal or to the bushing itself, and have contributed greatly to early bushing failure. The result has been an obvious and expensive loss of product due to downtime and the repair of refabrication of an expensive replacement bushing.

If a combination bus bar support and terminal clamp could be provided that would overcome misalignment problems during installation of bushings; that would provide ready adjustment of the terminal clamp on the terminal without stress; and also provide movement with the bushing during operation, a step forward in the art of melting heat softenable materials would be provided.

It is accordingly an important object of the present invention to provide a novel bus bar support and bushing terminal clamp.

Another object is to provide an improved combination bus bar support and bushing terminal clamp that is completely supported from the bushing frame thereby relieving the terminal of all support stress.

A further object is to provide an improved combination bus bar support and terminal clamp giving positive, micrometer-like vertical adjustability between the terminal clamp and the bushing terminal.

A still further object is to provide an improved bus bar support and bushing clamp that provides vertical support for a heavy flexible bus bar yet provides free horizontal floating movement conforming to the expansion and contraction of the fiber-forming bushing.

Another object is to provide an improved bus bar support and bushing terminal clamp that provides accurate alignment of the bushing in the bushing frame during installation of the bushing therein.

Other objects of this invention will appear in the following description and appended claims, reference being had to the accompanying drawings forming a part of this specification wherein like reference characters designate corresponding parts in the several views.

Figure 5:
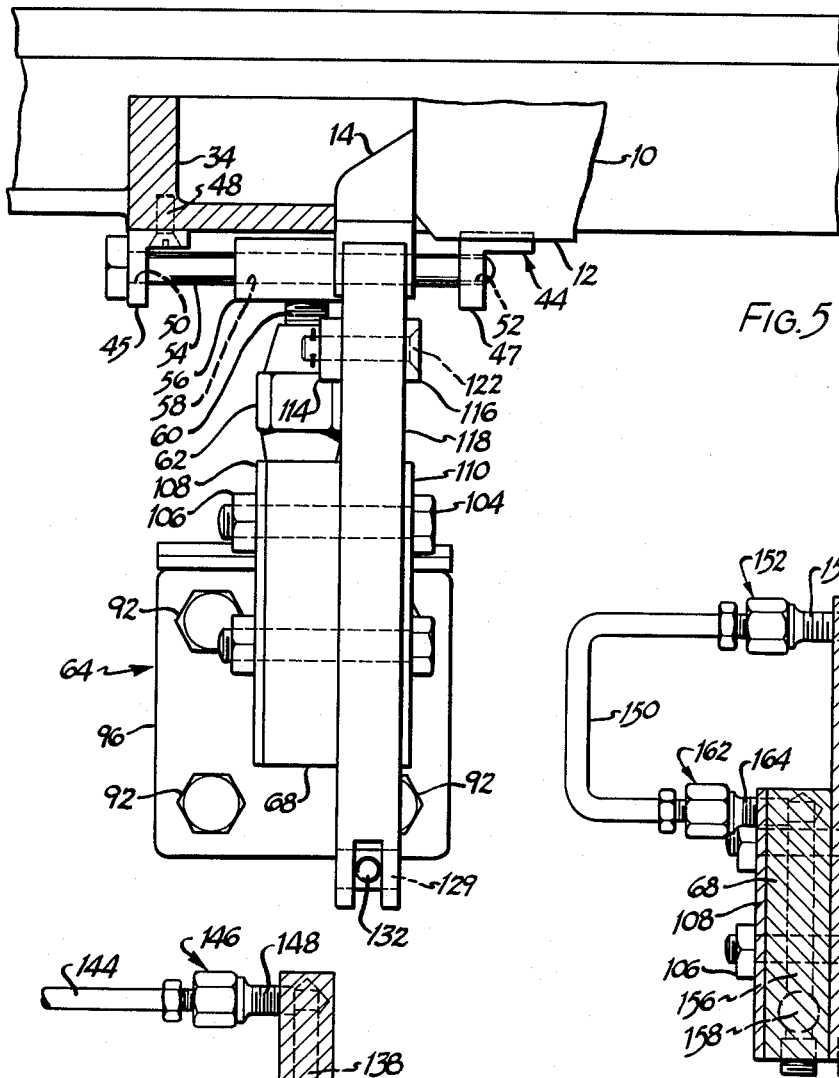
Figure 6:
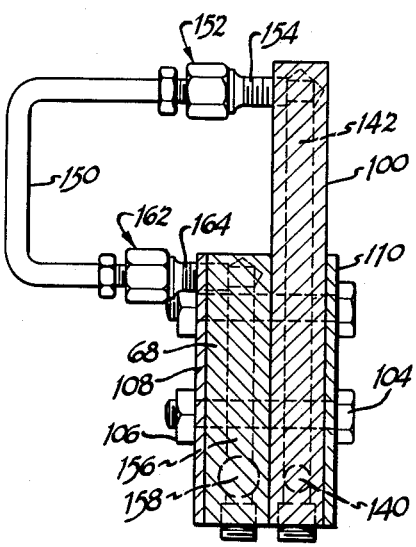
Figure 7:
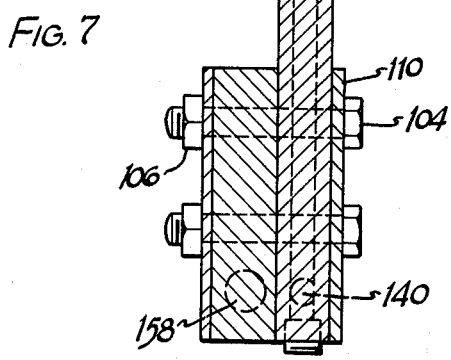

In the drawings:
FIGURE 1 is a side elevation view of apparatus used for the production of continuous glass fibers;
FIGURE 2 is a front elevational view of the apparatus of FIGURE 1;
FIGURE 3 is a top plan view of a flexible bus bar support and terminal clamp of the present invention;
FIGURE 4 is a front elevational view of the flexible bus bar support and terminal clamp of the invention;
FIGURE 5 is a side elevational view taken along the line 5—5 of FIGURE 4, looking in the direction of the arrows;
FIGURE 6 is a section view taken along the line 6—6 of FIGURE 4, looking in the direction of the arrows; and
FIGURE 7 is a section view taken along the line 7—7 of FIGURE 4, looking in the direction of the arrows.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Briefly the present invention provides a combination flexible bus bar support and bushing terminal clamp wherein the weight of the bus bar and terminal clamp is supported from the bushing frame and thus no tension or stress is applied to the bushing terminal. Further, the present apparatus provides a horizontal floating action so that the terminal clamp is moved freely with the bushing thereby preventing any stress or strain from being imposed on the terminal or the bushing. Also, the present apparatus provides for the quick and positively controlled adjustment of the terminal clamp along vertical and horizontal paths so that the clamp can be accurately placed on the terminal for adjusting the heat pattern of the bushing.

As shown in FIGURE 1, glass fibers of the continuous type are produced utilizing a bushing 10 or glass feeder of generally elongated, rectangular configuration and having a base 12 with a plurality of molten glass feeding orifices or tips therein. The bushing 10 is provided at each end with an electrical terminal 14, and electric current is supplied to each terminal by a heavy bus bar (not shown in FIGURES 1 and 2) to heat the bushing by its own resistance to glass melting temperatures.

When glass materials are placed in the bushing 10, they are melted by the heat generated therein and issue downwardly through the glass feeding orifices in the base 12 as small molten streams which are drawn into filaments 16. The filaments 16 are gathered into a strand 18 at a point 20 over a guide 22. The gathering guide 22 is suitably fixed in space and is supplied at its upper surface with a liquid binder from a supply conduit 24. From the gathering guide 22 the strand 18 passes downwardly and is wound on a mandrel 26 to form a package 28. The mandrel 26 is rapidly rotated by an electric motor contained within a cabinet 30. Rotation of the mandrel and winding of the strand 18 thereon provides the attenuating force for pulling the fibers 16 from the small molten streams of glass issuing from the bottom 12 of the bushing 10. As the strand 18 is wound, it is traversed to and fro across the surface of the mandrel by a traverser 32 to provide point contact between successive turns of the strand and thereby prevent sticking when the binder dries.

In order to withstand the rigorous temperatures encountered in glass melting and to resist corrosion, the bushing 10 is made of platinum or an alloy of platinum with iridium. This metal, though very resistant to high temperatures and corrosion, is nevertheless very ductile and accordingly is readily deformable, particularly when red hot, as it is at glass melting temperatures. Accordingly, the bushing and the terminals must be carefully supported and protected against bending stresses and strains or the assembly will be distorted or perhaps crack with resultant failure and stoppage of the manufacturing operation.

Accordingly, as shown in FIGURES 3, 4 and 5, the bushing 10 is supported upon a bushing frame 34 of rectangular configuration in plan, held by means of frame support brackets 36 beneath a building frame structure 38. The frame support brackets 36 are drilled and threaded bolt 40 are passed therethrough and into the frame structure 38; nuts 42 are threaded onto the bolts to secure the assembly.

The Bushing Frame Connection

In accordance with the present invention, the novel flexible bus bar support and terminal clamp is adapted to be supported from the bushing frame 34 and thereby remove all weight from the terminal 14 or the bushing 10 and prevent distortion and bending thereof. For this purpose spaced brackets 44 and 46 are secured by bolts 48 to the bushing frame 34. The brackets 44 and 46 are placed in parallel horizontal alignment and the vertically disposed arms 45 and 47 thereof are provided with two sets of aligned and spaced apertures. Each set of apertures includes a smooth hole 50 in the bracket 46 and a threaded hole 52 in the bracket 44. Smooth bodied bolts 54 are passed through the holes 50 and have their threaded ends turned into the threaded holes 52 of bracket 44. This bracket and bolt structure provides a means whereby the entire weight of the flexible bus bar support and bushing terminal clamp is supported from the bushing frame 34.

A carrier bar 56 is provided with a pair of parallel passages or bores 58 that are adapted to slidably receive the smooth bodied bolts 54 and thus be supported thereby.

The carrier bar 56 is provided centrally with a downwardly extending threaded arm 60 that is adapted to receive the upper end of a turnbuckle 62.

The bus bar terminal is indicated generally at 64 and includes a main body member 66 of generally square shape and substantial thickness which can be described as a heavy plate. Extending perpendicularly to the right from the plate 66 and integral therewith, as best shown in FIGURE 4, is a connecting arm 68 for supporting the terminal clamp, to be hereinafter described.

At the upper end of the main body member 66 there is provided a support cap 70 spaced from the main body member 66 by means of a layer of insulation 72. As shown in FIGURE 3 the support cap 70 includes flange members 74 which are apertured to receive bolts 76 that are insulated from the flanges 74 by small tubular sleeves between the flanges and the bolts. The bolts 76 are passed through the insulation into the main body member 66. Thus the support cap 70 is connected to, but electrically insulated from, the main body member 66 into which electrical current is applied. By this configuration, the main body member 66 is insulated from the bushing frame 34 and thus current cannot flow from one bus bar to another through the bushing frame.

The support cap 70 is provided with a vertically disposed threaded aperture into which a threaded rod 78 is turned down against the insulation 72 to lock it in place. An additional lock is provided in the form of a set screw 80 which is turned against the threaded rod 78 to retain it in fixed position. The bottom end of the turnbuckle 62 is threaded down onto the rod 78 and thus an adjustble supporting connection is provided between the main body member 66 and the bar 56 carried by the smooth bodied bolts 54 which are in turn carried by the brackets 44 and 46, fastened to the bushing frame 34.

Flexible Bus Bar Connection

As best shown in FIGURES 3 and 4, the bus bar utilized with the apparatus of the present invention comprises a heavy braided cable 82 having its terminal end press fitted and solder connected into a socket 84 of an end connector 86. A rubber hose 88 is clamped over the outside of the end connector in spaced relation to the braided cable 82 and thus a water passage is provided between the cable and the rubber hose for cooling the same.

The end connector 86 is formed integrally with an enlarged rectangular plate 90 conforming in exterior dimensions to the main body member 66 of the bus bar terminal 64. Both the rectangular plate 90 and the main body member 66 are provided with four aligned bolt holes and bolts 92 with nuts 94 are utilized to secure the assembly. Beneath the bolt heads there is provided a thin metal plate 96 of stainless steel and beneath the nuts 94 there are placed washers 98 of stainless steel to take up the pressure of the bolt heads and the nuts 94 to prevent deforming the copper metal of which the main body 66 and the rectangular plate 90 are composed.

Terminal Clamp Mount

As previously mentioned, the flexible bus bar terminal 64 has a connecting arm 68 extending to the right in vertical disposition and it is this connecting arm upon which the terminal clamp is mounted. Thus it will be seen that the flexible bus bar terminal, supported by the turnbuckle 62 is effective to support the terminal clamp and thus the entire weight of both units is borne by the turnbuckle with its support from the carrier bar 56.

The connecting arm 68 is made in the form of a generally rectangular heavy plate and extends to the right a substantial distance to provide a position for the attachment of the terminal clamp. The outer end of the connecting arm is superimposed over a terminal clamp center plate 100 which, as best shown in FIGURES 4 and 6 is made in the form of a yoke type member of generally rectangular, heavy plate configuration with a slot 102 at the upper end thereof. Thus, when the pressure is applied to the upstanding arms of the terminal clamp center plate 100, the slot 102 permits the arms to be moved toward each other to grasp the terminal 14 of the bushing 10. The yoke-like terminal clamp center plate 100 and the connecting arm 68 of the bus bar terminal 64 are provided with aligned holes and bolts 104 with nuts 106 are passed therethrough to secure the assembly. Stainless steel cover plates 108 and 110 are used beneath the bolt heads and beneath the nuts to take up the pressure of these units and thus prevent deformation of the copper of which the connecting arm 68 and the terminal clamp center plate 100 are formed.

The Terminal Clamp

The clamping mechanism which is adapted to press the arms of the terminal clamp center plate 100 into engagement with the bushing terminal 14 is suspended from the terminal clamp center plate 100. This suspension system includes a pivot pin 112 passed through a bore formed in the slot area adjacent the upper end of the slot 102 of the terminal clamp center plate 100.

The pivot pin carries support links 114 and 116 positioned adjacent each side of the terminal clamp center plate 100. A pair of compression arms 118 and 120 lie along each side of the yoke-like terminal clamp center plate 100 and are provided adjacent their upper ends with apertures through which pivot pins 122 are passed. The pivot pins also pass through suitable holes provided in the outer ends of the support links 114 and 116 and are retained in position by cotter pins passed through their extreme ends adjacent the plate 114 to retain the three members in movable relationship with each other. The upper ends of the compression arms 118 and 120 are provided with inwardly extending shoulders 124 and 126 which bear against corresponding notches formed adjacent the top edges of the arms of the terminal clamp center plate 100.

The bottom ends of the compression arms 118 and 120 are provided with enlarged boss sections 128 and 130 and these are provided with horizontally aligned slots, having pivot rods 129 and 131 therein with threaded bores to receive the ends of a turnbuckle 132. Thus it will be seen that when the turnbuckle 132 is moved to spread the arms 118 and 120 apart at the bottom, the shoulder portions 124 and 126 at the top ends of the arms 118 and 120 will be pressed inwardly to grip the terminal 14 of a bushing 10.

It will be noted that the slot 102 of the terminal clamp center plate is provided with a relief portion 133 adjacent the upper end thereof and that the slot 102 is slightly widened at the extreme top end to provide a pair of opposing vise-like jaws 134 and 136 that are adapted to grip each side of a terminal 14.

From the foregoing it will be seen that the flexible bus bar support and bushing terminal clamp of the invention provides a rigidly aligned unit wherein all parts are supported from the bushing frame and wherein the terminal clamp is supported from the flexible bus bar support and is accurately aligned with the bushing terminal.

The Cooling System

In view of the fact that copper is the principal ingredient in the flexible bus bar support and terminal clamp of the present invention, a cooling system is provided to prevent melting of the unit by transfer of the intense heat from the bushing 10 through the terminal 14. Also, the cooling of the unit is effective to extract heat from the bushing terminal and thereby control the heat pattern in the tip section of the bushing.

Accordingly, the terminal clamp center plate is provided with an inlet water passage 138 which extends from the top end down through the left side of the terminal clamp center plate 100 and connects with a cross passage 140, which in turn connects with a vertically disposed outlet passage 142. As shown in FIGURES 4 and 7, a feed line 144 is connected by means of a fitting 146 to a short inlet fitting 148 that is connected by a suitable opening into the inlet water passage 138. As shown in FIGURE 6, a looped line 150 is connected by means of a fitting 152 and a short connecting tube 154 into the top end of the vertical water passage 142 in the terminal clamp center plate 100. This tube conveys water from the vertical outlet passage 142 around and down to the top end of the connecting arm 68 of the main body member 66. The connecting arm 68 is provided with a vertical inlet water passage 156 that connects at the bottom end of the connecting arm 68 to a horizontal outlet passage 158 that extends the entire length of the connecting arm 68 through the main body member 66 of the flexible bus bar terminal 64 and on through plate 90 terminating just short of the surface of the rectangular cover plate 90. The end connector 86 is provided with axially divergent apertures 160 which connect with the passage surrounding the braided cable 82 beneath the rubber hose 88. Thus water passes through the looped line 150 fastened by means of a fitting 162 and short connecting tube 164 into the top end of the vertical inlet water passage 156 then through the horizontal outlet passage 158 into surrounding relationship with the cable to cool the connecting arm 68, main body member 66, rectangular plate 90 and the braided cable 82.

Functions and Advantages

As been pointed out hereinbefore, an important feature of the present bus bar support and bushing terminal clamp resides in the complete support of the unit from the bushing frame and thus no weight stress is applied to either the bushing terminal or to the bushing. Further, since the unit is supported from the bushing frame and is connected in aligned relationship to the bushing frame, along the horizontal axis of the bushing frame, it will be seen that the jaws 134 and 136 will be aligned with the bushing terminal 14 inasmuch as the bushing is held in aligned relationship to the axis of the bushing frame. Thus, when the bushing expands or contracts longitudinally, the entire assembly will move in aligned relationship freely with the bushing along the smooth bolts 54 held in the brackets 44 and 46 and thus no distortion will be applied to the terminals or to the bushing by either misalignment of the terminal clamp with the bushing terminal or by resistance of the terminal clamp to movement of the bushing as has been encountered heretofore in the art.

Adjusting the Heat Pattern

As has been previously mentioned, the heat pattern of a bushing changes after it has been in operation. To adjust the heat pattern it is required that the terminal clamp jaws be moved either vertically or horizontally for very short distances on the bushing terminal. This slight change adjusts the flow of electric current through the bushing tip section providing a desired degree of uniformity of heating therein. In accordance with the present invention, horizontal adjustment is readily effected by loosening the turnbuckle 132 extending between the compression arms 118 and 120 of the terminal clamp to relieve pressure of the jaws 134 and 136 against the side surfaces of the terminal 14. Thereafter, the entire assembly is moved horizontally along the slide bolts 54 to a desired position. This is done by gently tapping the unit to bring it to desired position and the movement is effected while the terminal clamp is entirely out of contact with the terminal.

Vertical adjustment of the terminal clamp jaws 134 and 136 on the terminal 14 is also effected readily and accurately by movement of the turnbuckle 62 in a desired direction to provide either upward vertical movement or downward vertical movement as desired. This motion is also effected while the jaws 134 and 136 are out of contact with the bushing terminal 14. After the desired adjustment has been made, the turnbuckle 132 is adjusted to bring the jaws 134 and 136 back into firmly engaging contact with the bushing terminal 14. Since the unit is axially aligned with the axis of the bushing and the terminal 14 lies on such axis, there will be no distortion applied to the terminal upon retightening the terminal clamp.

*Bushing Alignment Feature*

An often encountered problem of the prior art has involved initial misalignment of the terminal clamp and the bushing terminal. In the present invention this is substantially completely overcome by virtue of the fact that the slide bolts 54 which mount the entire unit are axially aligned with the bushing frame and with the axis of the bushing so that the center line of the bushing and the jaws match when the entire glass making unit including the frame, bushing and the terminal clamp are assembled. In actual operation, the bus bar support and terminal clamp assembly is first connected to the bushing frame and thereafter the bushing is set in place and adjusted so that the terminals are exactly aligned between the jaws 134 and 136 of the terminal clamp. The mechanism thereby serves as a jig or guide for aligning the bushing in the frame. Thus when any adjustment is subsequently made including either vertical or horizontal adjustment of the jaws on the bushing terminal, accuracy of alignment is insured and misalignment is overcome.

In summation, the present invention provides a new and improved bus bar support and terminal clamp which removes all strain from the terminal and places it on the bushing frame. Also, the present invention provides alignment of the bushing in the frame during installation. Further, the mechanism of the present invention provides vertical support to the bushing. Still further, the present mechanism provides free horizontal movement to follow the expansion and contraction characteristics of a bushing. Still further, the present mechanism provides vertical and horizontal adjustability of the terminal clamp on the bushing terminal; thus positive control of the heat pattern by horizontal and vertical movement of the clamp on the terminal is provided.

*Materials of Construction*

Inasmuch as it is the principal function of the bus bar support and terminal clamp of the present invention to conduct large quantities of electricity, the unit is made from a metal of high conducting characteristics. Thus copper forms a principal component. However, in the high stress, non-conducting portions of the unit as in the slide bolts 54, a high strength alloy is utilized. Thus silicon bronze is used to make the slide bolts 54. Also, as has been mentioned in various places in the foregoing disclosure, stainless steel cover plates 108, 110 and 96 along with stainless steel washers 98 are used to distribute stresses imposed by bolt heads and nuts used in assembling the device. Although the above metals of construction are preferred, it is to be considered within the scope of the invention to utilize other metals of high conductivity characteristics without departing from the scope of the invention.

I claim:

1. In a combination bus bar support and terminal clamp for a glass fiber-forming bushing having axially extending terminals, a bushing frame having an axis, a pair of brackets secured in depending relation beneath said bushing frame, a pair of aligned smooth bars carried by said brackets, said bars being parallel to the axis of the bushing frame, a carrier pad having a pair of aligned smooth bores therein slidably fitting upon said bars, a vertically depending arm on said carrier pad, a bus bar terminal comprising a main body member, means connecting a power cable to said main body member, a support cap secured in electrically isolated relation to the top of said body member, a vertically upstanding arm connected to said support cap, turnbuckle means connecting said vertically depending arm and said vertically upstanding arm, a connecting arm on said bus bar terminal, a terminal clamp mounted on said connecting arm, and said terminal clamp having a pair of jaws adapted to grip a terminal of the fiber-forming bushing, whereby said carrier pad provides free horizontal movement of said jaws with the bushing terminal and said turnbuckle provides controlled vertical adjustment between said jaws and the bushing terminal.

2. In a combination bus bar support and terminal clamp for a glass forming bushing having axially extending end terminals and mounted in a supporting frame in axial alignment with the frame, a pair of spaced and aligned support brackets connected to said frame, a pair of spaced and aligned smooth support members extending in supported relation between said brackets in axial alignment with the axis of the support frame, a carrier mounted on said aligned support members for free horizontal movement along a line parallel to the axis of said frame, a vertically disposed threaded support on said carrier, a bus bar terminal having a vertically extending threaded support, a turnbuckle connecting said threaded supports to join said carrier and said bus bar terminal in vertically adjustable relation, means connecting a power cable to said bus bar terminal a connecting arm on said bus bar terminal, a terminal clamp mounted on said connecting arm, said terminal clamp having opposing parallel jaws aligned with the axis of the frame to grasp a terminal without deflection, and means for cooling said terminal clamp and said bus bar terminal.

3. In a system for feeding electric current through an elongated glass melting bushing having axially extending end terminals, the bushing being mounted in a frame with the terminals in axial alignment therewith, a pair of spaced support brackets connected to the frame, a pair of spaced and aligned, smooth support members extending between said brackets and supported therefrom in axial alignment with the support frame axis and the bushing terminals, a carrier, means mounting said carrier on said aligned smooth supports for free sliding movement along a line parallel to the frame axis and bushing terminals, a support on said carrier, a bus bar terminal having a body, means connecting said support and said body to join said carrier and said bus bar terminal in adjustable relation to and from one another, means connecting a power cable to said bus bar terminal, a connecting arm on said bus bar terminal, a terminal clamp on said connecting arm and having opposed jaws aligned with a terminal of the bushing and retained in such alignment by said carrier, and said jaws being freely movable with the terminal during expansion and contraction of the bushing through the free movement between carrier and smooth support members.

4. In a system for feeding electric current through an elongated glass melting bushing having axially extending end terminals, the bushing being mounted in an elongated frame with the terminals along the axis of the frame, a smooth elongated rod-like support carried by the frame in axial alignment therewith and with the bushing terminals, a carrier, means mounting said carrier on said support for free slidable movement, parallel only to the axis of the support frame and bushing terminals, a combination bus bar support and terminal clamp suspended from said carrier and having aligned jaws movable to clamp against a terminal, means connecting a power cable to said combination support and clamp, and means connecting said carrier and said combination bus bar support and terminal clamp in adjustable relationship to and from one another, whereby the jaws are free to move axially with the terminal during expansion and contraction of the bushing through the free movement between carrier and smooth support.

5. In a system for feeding electrical current through an elongated glass melting bushing having axially extending end terminals, the bushing being mounted on an elongated frame with the terminals in axial alignment therewith, a smooth elongated rod-like support carried by the frame in axial alignment therewith and with the bushing terminals, carrier means mounted on said support for free slidable movement parallel to the axis of the support frame and bushing terminals, a bus bar support having a body, means connecting a power cable to said body, means connecting said body and said carrier in adjustable relation to and from one another, a connecting arm on said body, a terminal clamp mounted on said connecting arm and having opposed jaws defined by a slot in alignment with a bushing terminal, pivot means carried by said clamp, a yoke mounted on said pivot means and having jaws embracing said terminal clamp jaws, and means for moving said yoke jaws to move the terminal clamp jaws to grasp a terminal.

6. In a system for feeding electric current through a glass melting bushing having end terminals, the bushing being mounted in a frame, a smooth support carried by the frame and positioned in parallel alignment with a bushing terminal, carrier means mounted on said support for free slidable movement parallel to the terminal, a bus bar support having a body, means connecting a power cable to said body, means supporting said body from said carrier for adjustability relative to said support, a terminal clamp supported from said body and having opposed jaws alignable with the terminal, pivot means on said clamp, a yoke mounted on said pivot and having jaws embracing said clamp jaws, and means for moving said yoke jaws to move said clamp jaws.

References Cited in the file of this patent

UNITED STATES PATENTS

| | | |
|---|---|---|
| 544,306 | Just | Aug. 13, 1895 |
| 2,794,058 | Russell | May 28, 1957 |